US012652502B2

(12) United States Patent
Kamkar-Parsi et al.

(10) Patent No.: US 12,652,502 B2
(45) Date of Patent: Jun. 9, 2026

(54) METHOD FOR DETERMINING AN ACTIVITY OF AN INTRINSIC VOICE OF A USER OF A HEARING DEVICE, HEARING DEVICE, AND HEARING DEVICE SYSTEM

(71) Applicant: Sivantos Pte. Ltd., Singapore (SG)

(72) Inventors: Homayoun Kamkar-Parsi, Erlangen (DE); Pascal Stefan Zobel, Erlangen (DE); Hendrik Barfuss, Erlangen (DE)

(73) Assignee: Vivantos Pte. Ltd., Singapore (SG)

( * ) Notice: Subject to any disclaimer, the term of this patent is extended or adjusted under 35 U.S.C. 154(b) by 174 days.

(21) Appl. No.: 18/748,833

(22) Filed: Jun. 20, 2024

(65) Prior Publication Data

US 2024/0430627 A1 Dec. 26, 2024

(30) Foreign Application Priority Data

Jun. 21, 2023 (DE) .................... 10 2023 205 783.2

(51) Int. Cl.

*H04R 25/00* (2006.01)
*G10L 17/18* (2013.01)
*G10L 25/30* (2013.01)

(52) U.S. Cl.

CPC ....... *H04R 25/507* (2013.01); *H04R 2225/43* (2013.01)

(58) Field of Classification Search

CPC ... H04R 25/507; H04R 2225/43; G10L 17/18; G10L 25/30
USPC .................................................. 381/314, 312
See application file for complete search history.

(56) References Cited

U.S. PATENT DOCUMENTS

| | | | | |
|---|---|---|---|---|
| 4,637,402 | A * | 1/1987 | Adelman ............. | H04R 25/353 381/23.1 |
| 11,375,322 | B2 * | 6/2022 | Lunner ................... | G10L 25/48 |
| 12,069,436 | B2 * | 8/2024 | McKinney ........... | H04R 1/1041 |
| 2019/0394586 | A1 | 12/2019 | Pedersen et al. | |
| 2020/0294508 | A1 | 9/2020 | Kwasiborski et al. | |
| 2022/0279290 | A1 * | 9/2022 | McKinney ............. | H04R 25/50 |

FOREIGN PATENT DOCUMENTS

| | | |
|---|---|---|
| EP | 3222057 B1 | 5/2019 |

OTHER PUBLICATIONS

Pasi Pertila, Online Own Voice Detection for a Multi-Channel Multi-Sensor In-Ear Device, IEEE Sensors Journal, Dec. 15, 2021, p. 27686-27697, vol. 21 , No. 24.

* cited by examiner

*Primary Examiner* — Thjuan K Addy
(74) *Attorney, Agent, or Firm* — Laurence A. Greenberg; Werner H. Stemer; Ralph E. Locher

(57) ABSTRACT

A method for detecting activity of the own voice of a wearer of a hearing device by way of a signal processing apparatus of the hearing device. A first input signal is generated by a first input transducer, and a second input signal is generated by a second input transducer. The two input signals are supplied to a detection unit of the signal processing apparatus, which has a neural network and an input stage, which is connected in front of the neural network. Information signals are generated by the input stage on the basis of the two input signals and the information signals are evaluated by the neural network. A detection result is output by the detection unit based on the evaluation of the information signals by the neural network.

15 Claims, 3 Drawing Sheets

METHOD FOR DETERMINING AN ACTIVITY OF AN INTRINSIC VOICE OF A USER OF A HEARING DEVICE, HEARING DEVICE, AND HEARING DEVICE SYSTEM

The invention relates to a method for detecting activity of an own voice of a wearer of a hearing device. The invention also relates to a hearing device and to a hearing device system.

The term hearing device typically refers to traditional hearing aids that are used to help people who have impaired hearing. In the broader sense, however, this term also refers to devices that are designed to assist people who have normal hearing. Hearing devices for assisting people with normal hearing are also called "personal sound amplification products" or "personal sound amplification devices" (PSAD for short). Unlike traditional hearing aids, such hearing devices are not intended to compensate for hearing loss but are used specifically to assist and improve the normal human hearing capability in specific hearing situations.

Whatever the intended use, hearing devices usually have at least one input transducer, a signal processing apparatus and an output transducer as the essential components. The at least one input transducer is generally formed by an acousto-electric transducer, so for instance by a microphone, or by an electromagnetic receiver, for example an induction coil. In many cases are fitted a plurality of input transducers, so for instance one or more acousto-electric transducers and an electromagnetic receiver. As the output transducer is normally used an electro-acoustic transducer, for example a miniature loudspeaker (also known as a "receiver"), or an electromechanical transducer, for instance a bone conduction receiver. The signal processing apparatus is generally realized by an electronic circuit realized on a printed circuit board, and usually has an amplifier or amplifier unit independently thereof. Furthermore, hearing devices are often equipped with a transceiver, which facilitates wireless communication with other electronic devices, in particular with other hearing devices.

In some applications, two such hearing devices then form a hearing device system, in particular a binaural hearing device system. In this case, one of the hearing devices is typically designed for a left ear, and the other hearing device for a right ear.

It is known that using such hearing device systems in particular can alter the perception of the own voice, making it seem unusual and alien. Since such an effect is usually unwanted, the signal processing apparatus preferably uses various signal processing processes in signal processing, depending on whether or not the signals on which the signal processing is based include reproduction of the own voice.

In order to facilitate signal processing that differentiates in this way, suitable hearing devices are configured for what is known as own-voice detection (OVD). Thus they detect when the own voice of the wearer of the hearing device is active, and when it is not. EP 3 222 057 B1, for example, describes such own-voice detection. In particular, the term own-voice recognition is also often used if the own-voice detection is additionally personalized in some manner so that it is possible to recognize a particular voice of a particular hearing device wearer.

Against this background, the object of the invention is to specify an advantageous method for detecting activity of an own voice of a wearer of a hearing device. The object of the invention is also to specify an advantageously designed hearing device and an advantageously designed hearing device system.

This object is achieved according to the invention by a method having the features of claim 1, by a hearing device having the features of claim 14, and by a hearing device system having the features of claim 15. The dependent claims contain preferred developments. The advantages and preferred embodiments mentioned with regard to the method can be applied analogously also to the devices, so to the hearing device and to the hearing device system, and vice versa.

The method according to the invention is used to detect activity of an own voice, namely the voice of a wearer of a hearing device. The method here expediently comprises at least one method part, namely the detecting of the activity itself, this method part in particular being performed by the hearing device, and more precisely by means of a signal processing apparatus of the hearing device.

The hearing device according to the invention is in turn designed and configured to perform at least one method step of the method according to the invention in at least one operating mode. In particular, the hearing device according to the invention is designed to carry out the aforementioned at least one method part, namely the detecting of the activity. For this purpose, the hearing device according to the invention has the aforementioned signal processing apparatus. The hearing device according to the invention is hence then configured to recognize automatically, or in an automated manner, in the at least one operating mode when the voice of the wearer of the hearing device, i.e. of the hearing device according to the invention, is active, and when it is not.

Finally, the hearing device system according to the invention has two hearing devices according to the invention of the aforementioned type. It is then preferably the case that one of these hearing devices is designed for a left ear, and the other of the two hearing devices for a right ear. In addition, the hearing device system is preferably in the form of a binaural hearing device system, as it is known.

In the course of executing the method, i.e. the method according to the invention, and in particular the at least one method part, a first input signal is generated by means of a first input transducer of the hearing device, i.e. of the hearing device according to the invention, and a second input signal is generated by means of a second input transducer of the hearing device.

The two input signals are then supplied to a detection unit of the signal processing apparatus, which has a neural network and an input stage, which is connected in front of the neural network. Alternatively, the two input signals are supplied to a filter bank of the signal processing apparatus, and here split into subsignals. In this case, the subsignals are then supplied to the detection unit. In other words, the two input signals are supplied to the detection unit as unsplit or split signals.

A suitable filter bank here is typically embodied such that this filter bank specifies two or more frequency channels, frequency bands or frequency ranges, namely n frequency channels, frequency bands or frequency ranges, and performs, at least approximately, a splitting into subsignals such that each subsignal has all the frequency components of an input signal that can be allocated to one of the frequency channels/frequency bands/frequency ranges k from k=1 . . . n. Hearing devices that have such a filter bank are also known as multi-frequency-channel hearing devices. If the hearing device is in the form of a multi-frequency-channel hearing device, then this is expediently embodied as an n-frequency-channel hearing device, for instance where n is 2, 4, 8, 16, 32 or 48. Hence the frequency spectrum then is split into n frequency bands, frequency ranges or frequency channels.

In addition, information signals are generated by means of the input stage on the basis of the two input signals, so on the basis of the unsplit or split input signals, and these information signals are then evaluated by the neural network. A detection result is output by the detection unit based on the evaluation of the information signals by the neural network. Said detection result is typically a simple binary signal indicating whether or not the own voice, i.e. the voice of the wearer of the hearing device, is currently active.

The generation of an output signal for an output transducer of the hearing device is then preferably performed on the basis of this detection result. This typically involves using different signal processing processes or parameterizations for generating the output signal, depending on whether the detection result indicates that the own voice of the wearer is, or is not, active.

In addition, in the method described here, preferably no personalization of the detection unit is performed. In other words, the own-voice detection realized by the method is not, nor will be, adapted to a particular wearer, i.e. to a particular person. Therefore, also preferably, the detection unit is not adapted after being issued or shipped by the manufacturer. Hence in this case, the manufacturer specifies not only the hardware of the detection unit but also the software, the programming and/or the settings of the detection unit. Thus, in particular, nor are any subsequent changes made to parameters or parameter values, or at least none in which the wearer is involved in any way.

The aforementioned neural network is expediently what is known as an artificial neuronal network, or ANN for short. Depending on the usage, the artificial neural network is in the form of what is known as a feedforward network, for example. Preferably, it is in the form of a recurrent network, as it is known. In any case, the artificial neural network preferably has two or more layers, as they are known. Hence, in particular, it is in the form of a deep neural network (DNN). Alternatively, only one layer is formed. Expedient topologies are, for example, artificial neural networks designed in the form of an LSTM (long short-term memory), GRU (gated recurrent unit) or CNN (convolutional neural network), or neural networks that have a mixed topology.

In order to implement the method, or at least the aforementioned at least one method part, namely the detecting of the activity itself, the input stage also preferably has two filters, namely a first filter and a second filter, wherein the first filter corresponds to a first filter type, and the second filter corresponds to a second filter type. In the at least one operating mode of the hearing device, a first filter signal is then generated by means of the first filter, and a second filter signal by means of the second filter.

A filter of the first filter type and a filter of the second filter type are both typically a filter for spatial separation, in particular what is known as a beamformer. Thus, in particular, they are not filters for pure frequency separation such as those used for realizing an aforementioned filter bank.

In particular if the hearing device is in the form of an above-described multi-frequency-channel hearing device, it is also advantageous if the input stage is in the form of a multi-frequency-channel input stage. In other words, either subsignals are supplied to the input stage in the manner presented above, or the input stage itself has a filter bank of the above-described type that is used to split the supplied unsplit input signals into subsignals. The input stage is typically in the form of an n-frequency-channel input stage, where n equals 2, 4, 6, 8, 16, 32 or 48, for example. Hence the frequency spectrum then is split into n frequency bands, frequency ranges or frequency channels. From each of the input signals, n subsignals are then accordingly present in the input stage, at least after the filter bank. The further processing of the subsignals in the input stage is then typically performed in frequency channels. In other words, in the frequency channel k from k=1 . . . n, typically only the subsignal of the first input signal containing the frequency components from the frequency band k is processed further, as is the subsignal of the second input signal containing the frequency components from the frequency band k.

In an advantageous development, the multi-frequency-channel input stage has two filters for each frequency channel k from k=1 . . . n, namely a first frequency-channel k filter and a second frequency-channel k filter, where the first frequency-channel k filter corresponds to the first filter type, and the second frequency-channel k filter corresponds to the second filter type. Then in the at least one operating mode, two filter signals are generated in each frequency channel k, namely a first frequency-channel k filter signal by the filter of the first type, and a second frequency-channel k filter signal by the filter of the second type.

As already explained, a filter of the first filter type and a filter of the second filter type are both typically a filter for spatial separation. Preferably each of the two filter types is then designed such that each realizes a directivity common to the two aforementioned microphones of the hearing device, namely a first directivity by the first filter type and a second directivity by the second filter type. Thus two different directivities are preferably realized by the two filter types.

The two directivities here differ in particular with regard to the specified spatial directions in which the sensitivity of the particular directivity reaches its maximum. The respective two spatial directions are expediently specified with respect to a front direction, namely in particular by an angle for each of the two spatial directions with respect to the angle 0°, which is specified for the front direction. If the hearing device is then worn by the wearer, the front direction typically points in the direction in which the face of the wearer of the hearing device is pointing. If then the wearer is also looking straight ahead, the front direction is moreover also in the direction of view of the wearer.

For the first filter type, a spatial direction is then preferably specified which, with respect to the front direction, and in particular based on the wearer of the hearing device and his head orientation, points into a front hemispherical space. Also preferred, a spatial direction is specified that lies with respect to the front direction in a range between 270° and 90°, and in particular in the range between 340° and 20°, so for example at approximately 0°.

For the second filter type, a spatial direction is preferably specified which, with respect to the front direction, and in particular based on the wearer of the hearing device and his head orientation, points into a rear hemispherical space. Also preferred, a spatial direction is specified that lies with respect to the front direction in a range between 95° and 265°, and in particular in the range between 160° and 200°, so for example at approximately 180°.

Embodiment variants are also expedient in which the first and the second filter type are embodied such that the first filter type suppresses own voices less strongly than the second filter type. This means then that during operation, in particular signal components that reproduce the own voices are suppressed more strongly by the second filter type than the first filter type.

Embodiment variants are also advantageous in which the first filter type is designed to extract and accentuate wanted signals from defined wanted signal sources, in particular from defined wanted signal sources that are positioned in front of the wearer of the hearing device. Conversational partners are typically specified here as the defined wanted signal sources.

At least in the case of some advantageous embodiment variants, the second filter type is designed to mask or suppress own voices, and hence also to mask or suppress the own voice of the wearer of the hearing device, so in particular of the current wearer of the hearing device. It is also preferred here that signal components that reproduce own voices are masked or suppressed more strongly than all other signal components.

It is also advantageous if the two filter types are static filters, each having fixed filter coefficients. In this case, the filter coefficients are preferably specified by the manufacturer, and not changed again once specified by the manufacturer.

According to an alternative variant, only one of the two filter types is a static filter having fixed filter coefficients. The other is then typically embodied as an adaptive filter. A variant is also expedient in which the two filter types are adaptive filters. Such adaptive filters do not have fixed filter coefficients. Instead, the filter coefficients are adapted by the hearing device during operation of the hearing device.

As already explained above, according to at least one preferred embodiment, the first filter type is embodied as a filter for spatial separation having a specified spatial direction as regards the directivity, and is designed to extract or accentuate wanted signals from defined wanted signal sources. The following should be noted here: as a soon as the specified spatial direction deviates from the direction in which the wanted signal source is located, the filter for spatial separation will usually also suppress at least part of the wanted signal. This is a typical result with usual filter algorithms. The strength of this suppression primarily depends on the degree to which the spatial direction and the direction of the wanted signal source differ from each other.

Said specifying of filter coefficients is not usually part of the aforementioned at least one method part, which is referred to below as the second method part, but of a further method part, referred to below as the first method part, which is not normally performed by the hearing device. Part of this further method part, i.e. of the first method part, is preferably a method step in which suitable filter coefficients are determined. These determined suitable filter coefficients are then specified for the filters and hence for the second method part, namely for detecting the activity itself, so in particular are stored in the hearing device.

Suitable filter coefficients are preferably determined here by analyzing recorded acoustic signals. Said recording is typically performed by means of a hearing device prototype or a hearing device dummy, and the analysis is also preferably carried out using a separate computing unit. The corresponding hearing device prototype, hearing device dummy or the corresponding computing unit also preferably has adaptive test filters or simulates corresponding adaptive test filters, which are then used to determine suitable filter coefficients for the static filters of the hearing device.

For the determining of suitable filter coefficients for the second filter type are typically used recorded acoustic signals in which are recorded own voices of various test wearers. In other words, various people act as test wearers, so in particular as test wearers of an aforementioned hearing device prototype or hearing device dummy, and acoustic signals containing their own voices are analyzed in order to find suitable filter coefficients for the second filter type, and then to use these as the fixed filter coefficients. For the determining of suitable filter coefficients for the first filter type, on the other hand, are typically used recorded acoustic signals in which various wanted signal sources are recorded that are positioned, in particular, in front of an aforementioned test wearer or an artificial head. Conversational partners typically act here as the wanted signal sources. In both cases, the recorded acoustic signals preferably do not contain background noise.

It is also preferred that the neural network is trained in the aforementioned first method part, and in particular is trained without involvement of the subsequent wearer of the hearing device. Said training is typically carried out by the manufacturer of the hearing device.

In addition, the neural network is also preferably trained using a number of recorded acoustic signals. These typically comprise the recorded acoustic signals that are used to determine the suitable filter coefficients. Alternatively or additionally, said number of recorded acoustic signals for the training of the neural network comprise recorded acoustic signals containing various background noises.

According to an embodiment variant, for the training of the neural network are then used, for example, recorded acoustic signals in which are recorded own voices of various test wearers together with various background noises, and/or recorded acoustic signals in which are recorded various wanted signal sources together with various background noises, and/or recorded acoustic signals in which are recorded own voices of various test wearers together with various wanted signal sources and together with various background noises.

In a further embodiment variant, own voices of various test wearers, various wanted signal sources and various background noises are recorded separately, and combined subsequently for the training of the neural network, if applicable using different weightings.

It is also advantageous if an aforementioned hearing device prototype or an aforementioned hearing device dummy is used as part of the training in order to record the aforementioned acoustic signals. In some cases, the recorded signals are further used to train first a neural network that is realized in the hearing device prototype or hearing device dummy or by a separate computing unit. The training of the neural network in the hearing device is then carried out also preferably by transferring to the neural network in the hearing device the training status of the neural network in the hearing device prototype or hearing device dummy or in the separate computing unit.

Thus the input stage of the detection unit then preferably generates two or more filter signals in the manner described earlier, i.e. the first filter signal and the second filter signal, or the first frequency-channel n filter signals and the second frequency-channel n filter signals. It is also preferred here that, for the purpose of generating at least one information signal, each of the filter signals is then combined in the input stage with a reference signal, which is based on at least one of the two input signals.

In an advantageous development, a real-valued attenuation quantity is determined by the combining of one of the filter signals with one of the reference signals, with an information signal being generated expediently on the basis of the attenuation quantity. According to an alternative, a complex-valued attenuation quantity is determined. Two embodiment variants are provided for this alternative. In the case of the first embodiment variant, an information signal is generated on the basis of the complex-valued attenuation quantity. In the case of the second embodiment variant, on the other hand, two information signals are generated on the basis of the complex-valued attenuation quantity. In this case, for example, separate information signals are generated for a real part and an imaginary part, or for an amplitude and a phase.

As already explained above, the information signals generated in the input stage are evaluated by the neural network, and an evaluation result is expediently output by the neural network on the basis of the evaluation. It is also preferred that said evaluation of the information signals, and in particular of the attenuation quantities, is carried out such that the neural network outputs as the evaluation result a prediction value, namely a type of probability value, in particular a value in the range of 0 to 1.

It is also preferred that the evaluation result of the neural network is supplied to an output stage of the detection unit, which preferably has a comparator unit and is expediently connected to the output of the neural network. In the comparator unit, the evaluation result is also preferably compared with a reference, in particular a threshold value, thereby generating a detection result. If, for example, the aforementioned probability value lies above the aforementioned threshold value, then it is determined as the detection result that the own voice of the wearer is active. If, on the other hand, the probability value lies below the threshold value, then it is determined as the detection result that the own voice is not active. This detection result is then preferably output by the detection unit.

According to a further embodiment variant, although the evaluation result is again compared with the reference in the comparator unit, this generates merely a provisional detection result. The provisional detection result is then also preferably analyzed, together with a further provisional detection result, in the output stage, for instance in an additional logic unit of the output stage, whereby the detection result is then determined, i.e. the final detection result. This detection result is then typically output by the detection unit.

The further provisional detection result is preferably determined by a further detection unit in a further hearing device, and transmitted by this hearing device. This variant of the method is advantageous in particular in hearing device systems having two hearing devices of the type described above. In a hearing device system of this type, each of the two hearing devices preferably has an above-described signal processing apparatus with detection unit. In the at least one operating mode, then preferably a preliminary detection result is generated in each detection unit. The preliminary detection result of a hearing device is then transmitted typically wirelessly to the other hearing device, and is analyzed here together with the preliminary detection result from that hearing device. The final detection result determined here is output by the corresponding detection unit. This is then available internally. In the other hearing device effectively the same process preferably proceeds in parallel. Again in this case, the two preliminary detection results are analyzed, and a final detection result is determined.

In any case, each hearing device according to the invention has at least the two aforementioned input transducers, the aforementioned signal processing apparatus and the aforementioned output transducer as essential components. Each of these input transducers is generally formed by an acousto-electric transducer, so for instance by a microphone. An electro-acoustic transducer, for example a miniature loudspeaker, or an electromechanical transducer, for instance a bone conduction receiver, normally acts as the output transducer. The signal processing apparatus is generally realized by an electronic circuit realized on a printed circuit board, and usually has in addition an amplifier or amplifier unit independently thereof. Furthermore, each hearing device according to the invention is typically equipped with a transceiver, which facilitates wireless communication with other electronic devices, in particular with another hearing device according to the invention.

Exemplary embodiments of the invention are explained in more detail below with reference to a schematic drawing, in which.

Corresponding parts are each denoted by the same reference signs in all the figures.

Figure 1:
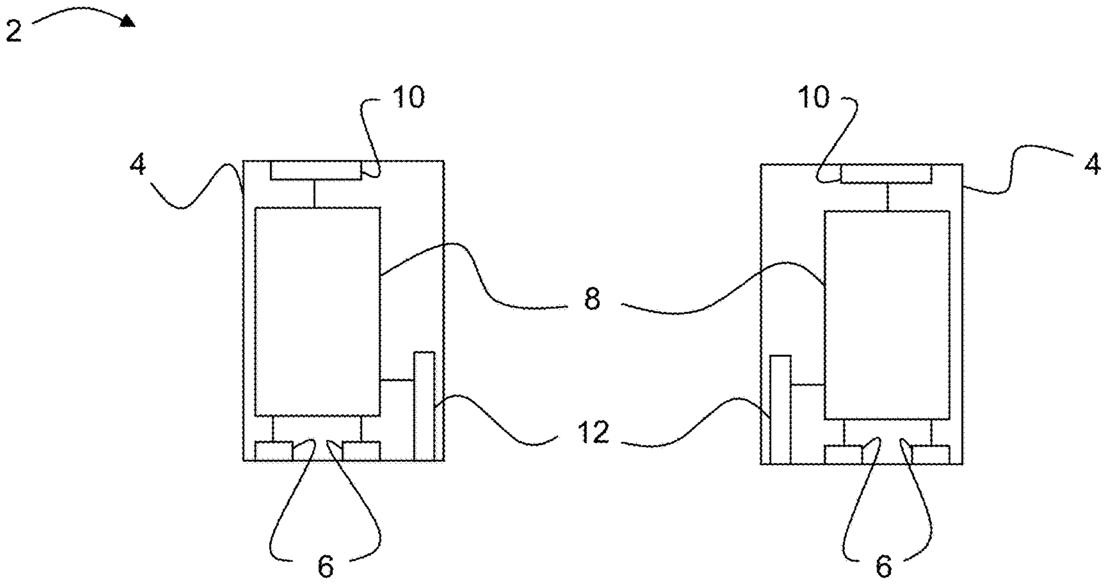
FIG. 1 shows a block diagram of a binaural hearing device system having a left-hand hearing device and a right-hand hearing device.

A hearing device system 2 explained below by way of example and shown schematically in FIG. 1 consists of two hearing devices 4, and is preferably in the form of a binaural hearing device system 2. Each of the two hearing devices 4, of which typically one is designed for a left ear and one for a right ear, has in the exemplary embodiment two input transducers 6, a signal processing apparatus 8, an output transducer 10, and an antenna unit 12.

In the exemplary embodiment, each of the input transducers 6 is formed by a microphone. Miniature loudspeakers act as the output transducers 10 by way of example. The signal processing apparatuses 8 are preferably each realized by an electronic circuit realized on a printed circuit board. The antenna units 12 are used for wireless communication and in particular for data exchange between the two hearing devices 4.

The signal processing apparatuses 8 of the two hearing devices 4 are substantially identical in the exemplary embodiment. One of these signal processing apparatuses 8 is shown schematically in a block diagram in FIG. 2, and is described in greater detail below. It has a plurality of units, namely a transceiver 14, two analog-to-digital converters 16, a main unit 18, a digital-to-analog converter 20, and a detection unit 22. At least one of these units also has a plurality of subunits, namely the detection unit 22.

For each of the units and each of the subunits, and in particular each subunit mentioned below, it holds that, depending on the usage, it is formed by a dedicated electronic circuit that forms solely the corresponding unit or subunit, or is formed solely by a dedicated program module/software module. In particular, an embodiment of the signal processing apparatus 8 is typical in which some units or subunits are formed by a dedicated electronic circuit, and some solely by a dedicated program module.

In any case, the detection unit 22 is designed and configured for what is known as own-voice detection in at least one operating mode of the hearing device 4. Therefore the corresponding hearing device 4 is configured to recognize automatically in the at least one operating mode when the voice of a wearer of the hearing device 4 is active, and when it is not. In this at least one operating mode, the detection unit 22 then outputs a detection result, which detection result is preferably a simple binary signal indicating when the own voice, i.e. the voice of the wearer of the hearing device 4, is currently active or not.

Figure 2:
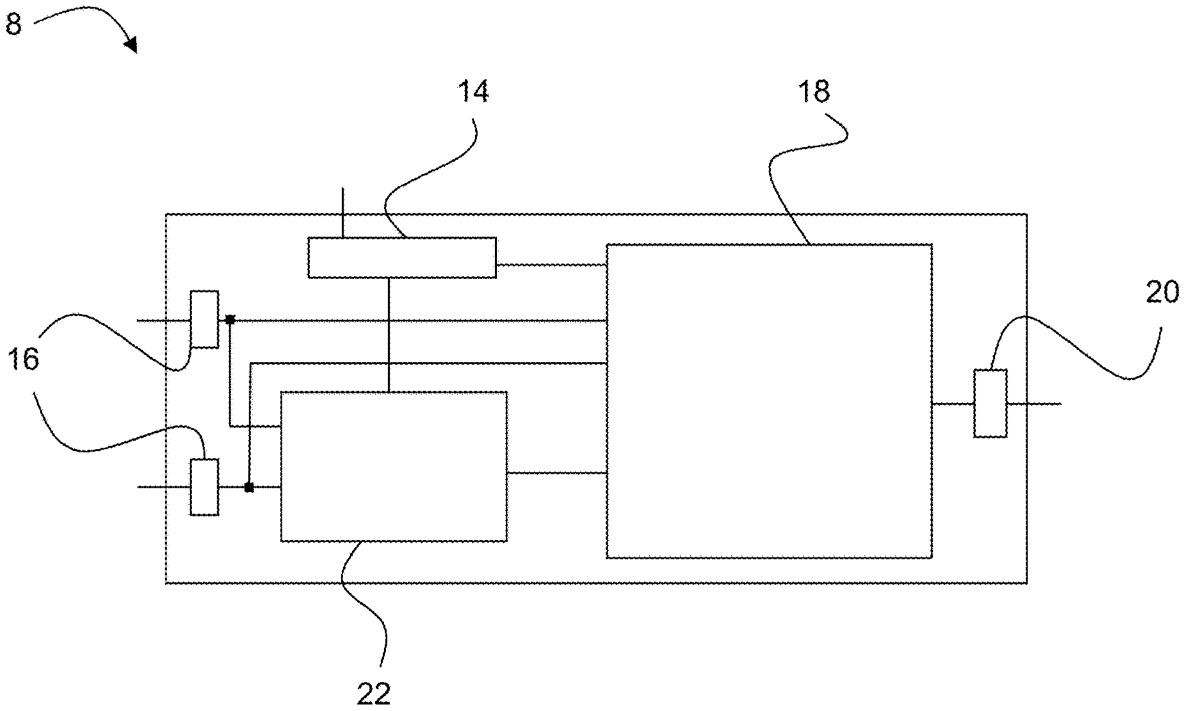
FIG. 2 shows in a block diagram a signal processing apparatus of the left-hand hearing device containing a detection unit.

Based on this detection result, or depending on this detection result, which in the exemplary embodiment of FIG. 2 is supplied to the main unit 18, the main unit 18 then typically generates an output signal for the output transducer 10 of the hearing device 4. This involves using different signal processing processes or signal processing programs for generating the output signal depending on whether the detection result indicates that the own voice of the wearer is, or is not, currently active.

Irrespective of the signal processing process currently being used, the output signal is generated in such a way that the main function of the hearing device 4 is thereby fulfilled, namely the amplification of acoustic signals. This is done according to a principle known per se by processing input signals generated by the input transducers 6. These input signals are digitized in the analog-to-digital converters 16 and supplied to the main unit 18 as digital input signals. The digital input signals are here processed by means of the aforementioned different signal processing processes, thereby generating a digital output signal. This digital output signal is then converted in the digital-to-analog converter and finally supplied to the output transducer 10.

In parallel, the digital input signals are also supplied to the detection unit 22, as is indicated in FIG. 2. Here, the digital input signals are then used for the aforementioned own-voice detection. This own-voice detection is carried out by means of two subunits of the detection unit 22, namely by means of a neural network 24, so by an artificial neural network, and by means of an input stage 26 connected in front of the neural network 24. The input stage 26 is typically in the form of a multi-frequency-channel input stage.

Figure 3:
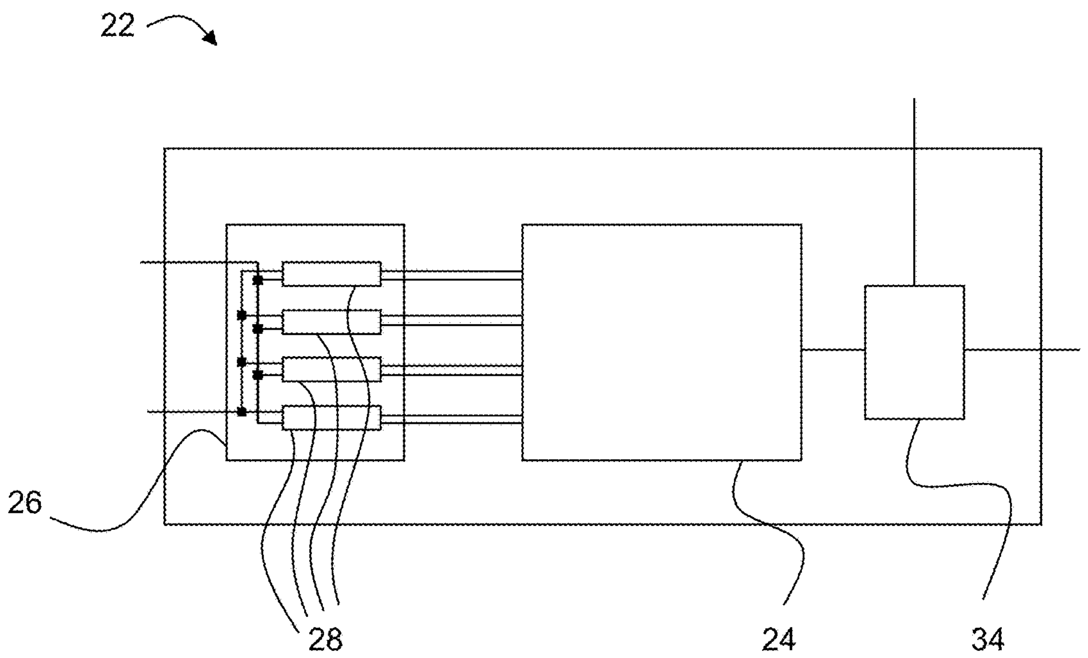
FIG. 3 shows in a block diagram the detection unit containing an input stage having four channels.

In other words, the two digital input signals are supplied to a filter bank (not shown) of the signal processing apparatus 8, and are each split here into subsignals. Said filter bank is embodied such that this filter bank specifies two or more frequency ranges, and performs, at least approximately, a splitting into subsignals such that each subsignal has all the frequency components of a digital input signal that can be allocated to precisely one of the frequency ranges. The multi-frequency-channel input stage is in the form of a 4-frequency-channel input stage, for example, as indicated in FIG. 3.

Suitable filter banks are known in principle, and hearing devices having such a filter bank are usually known as multi-frequency-channel hearing devices. In the exemplary embodiment, the hearing devices 4 of the hearing device system 2 are in the form of 4-frequency-channel hearing devices, and each have a 4-frequency-channel input stage. Hence the frequency spectrum is split into 4 frequency ranges, also called frequency channels. As a result, the two digital input signals are then supplied, split into subsignals, to the detection unit 22. These subsignals are then available to the input stage 26 and are processed further here in frequency channels.

Figure 4:
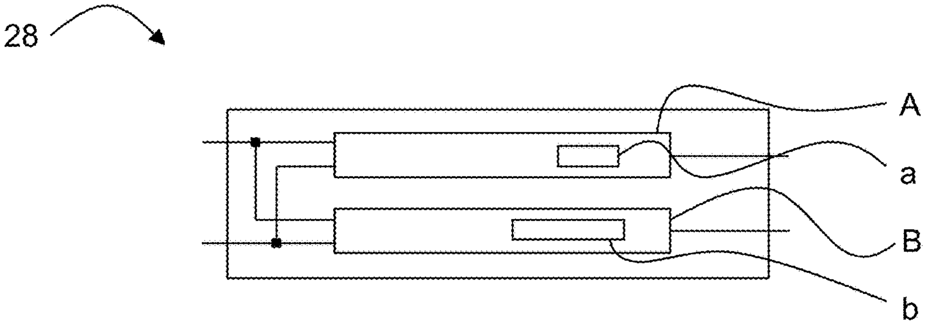
FIG. 4 shows in a block diagram one of the four channels containing two measurement modules.

The further processing in frequency channels is carried out by means of subunits of the input stage 26, namely channel modules 28, where a channel module 28 is realized for each frequency channel k from k=1 . . . 4, so for each frequency range k. FIG. 4 shows such a channel module 28 by way of example.

Each channel module 28 in turn comprises a first submodule A as a first subunit, and a second submodule B as a second subunit. Each submodule A has additionally as an essential component a filter a, which corresponds to a first filter type. Each submodule B in turn has as an essential component a filter b, which corresponds to a second filter type. Therefore the input stage 26 has in total four filters of filter type a and four filters of filter type b.

A filter a of the first filter type and a filter b of the second filter type are both typically a filter for spatial separation. Each of the two filter types is designed such that each realizes a directivity common to the two aforementioned microphones of the hearing device 4, namely a first directivity by the first filter type and a second directivity by the second filter type.

Figure 6:
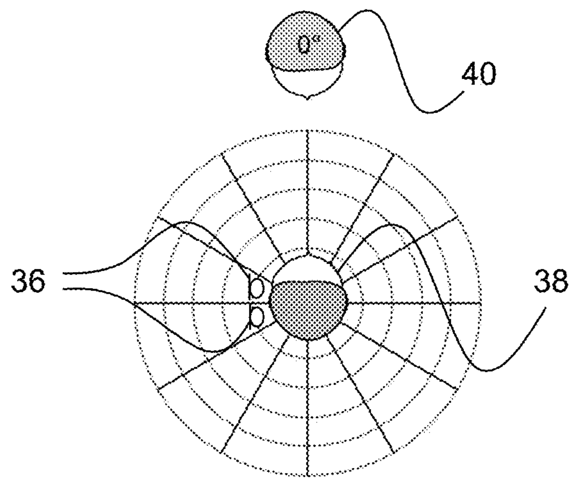
FIG. 6 shows a test arrangement in a plan view.

The two directivities here differ in particular with regard to the specified spatial directions in which the sensitivity of the particular directivity reaches its maximum. The corresponding two spatial directions are expediently specified with respect to a front direction at 0°, towards which the face of the wearer of the hearing device typically points, as indicated in FIG. 6. For the first filter type in the exemplary embodiment, a spatial direction is specified at 0°, and for the second filter type a spatial direction is specified at 180°.

The two filter types are preferably also in the form of static filters, each having fixed filter coefficients. In this case, the filter coefficients are preferably selected and specified by the manufacturer.

In the input stage 26 embodied in this way, in the frequency channel k, two subsignals are then supplied to each of the two submodules A, B of the k-th channel module 28, namely the k-th subsignal of the one digital input signal and the k-th subsignal of the other digital input signal. Both in the submodule A of the k-th channel module 28 and in the submodule B of the k-th channel module 28 is then generated in each case a filter signal, and a real-valued attenuation quantity is determined on the basis of this filter signal.

Thus in total, eight real-valued attenuation quantities are determined, and each of these attenuation quantities is then transferred by an associated information signal to the neural network 24. Hence eight information signals are supplied to the neural network in the exemplary embodiment.

Figure 5:
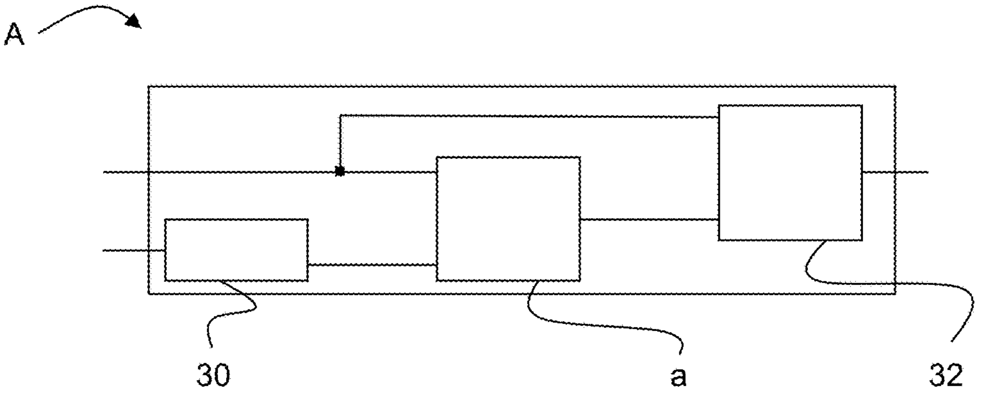
FIG. 5 shows in a block diagram one of the two measurement modules containing a filter.

FIG. 5 now shows by way of example the k-th submodule A. However, the following explanations can also be applied analogously to every other submodule of the submodules, whether submodules A or submodules B. According to FIG. 5, the k-th submodule A is now supplied with the k-th subsignal of the one digital input signal and the k-th subsignal of the other digital input signal, referred to below for short as the first subsignal and the second subsignal.

The first subsignal is then preferably supplied unprocessed to the filter a of the k-th submodule A. The second subsignal, on the other hand, is preferably supplied in processed form to the filter a of the k-th submodule A, with the second subsignal being processed for this purpose in an equalizer unit 30. The spatial separation described above is then implemented by means of filter a and equalizer unit 30.

Then the filter a generates on the basis of the two subsignals a filter signal, which it supplies to a measurement unit 32. The unprocessed first subsignal is also supplied to this measurement unit 32, and then one of the aforementioned attenuation quantities is finally determined in the measurement unit 32 on the basis of the filter signal and the first subsignal.

The embodiment of the k-th submodule A described above represents just one expedient embodiment. In this embodiment, the equalizer unit 30 typically has the function of multiplying the incoming signal with a frequency-dependent, complex-valued scalar weight. In an alternative embodiment, the filter a takes on this function and the equalizer unit 30 is then omitted.

In order to determine the attenuation quantity, auxiliary quantities, for example, are first determined in the measurement unit 32, namely a first auxiliary quantity based on the first subsignal, and a second auxiliary quantity based on the filter signal, and these auxiliary quantities are then compared with each other. For example, such an auxiliary quantity is a power.

According to an alternative, which is not shown explicitly, a complex-valued attenuation quantity is determined instead of a real-valued attenuation quantity in the measurement unit 32. For this purpose, amplitude information and phase information in the signals, i.e. in the first subsignal and also in the filter signal, are typically analyzed in the measurement unit 32.

Two embodiment variants are provided for this alternative. In the case of the first embodiment variant, there are eight complex-valued attenuation quantities available in total, and each of the eight complex-valued attenuation quantities is transferred by an associated information signal to the neural network 24.

In the case of the second embodiment variant, there are two-times-eight quantities available in total, and each of the sixteen quantities is transferred by an associated information signal to the neural network 24. In this case, for example, real part and imaginary part, or amplitude and phase, are transferred to the neural network 24 in separate information signals.

Furthermore, in some usages, it is expedient to supply to the neural network 24 in addition to the aforementioned information signals, one or more further information signals, so information signals containing other information.

In the exemplary embodiment shown, however, for the sake of simplicity, precisely eight information signals are supplied to the neural network 24 by way of example, where eight real-valued attenuation quantities are determined in the manner described above, and each of these attenuation quantities is transferred by an associated information signal to the neural network 24.

The neural network 24 has a number of artificial neurones (not shown explicitly), which are arranged in one or more layers. The determined attenuation quantities are then evaluated by means of these neurones in order to determine an evaluation result. This evaluation result is ultimately output by the neural network 24. In the exemplary embodiment, an evaluation signal containing a type of probability value, i.e. a value in the range 0 to 1, is output as the evaluation result.

The evaluation signal is then supplied to a comparator unit (not shown explicitly) of an output stage 34 of the detection unit 22, and is compared here with a reference, namely a reference value. Said reference value is fixed, and typically lies in a range of 0.3 to 0.7 and in particular from 0.4 to 0.6, so for example equals 0.5. Then thereby the comparator unit typically generates a detection result indicating whether or not an own voice was detected by the detection unit 22.

The process described above for own-voice detection usually runs permanently in the background in the at least one operating mode of the hearing device 4, and this preferably applies to both of the hearing devices 4 of the hearing device system 2. Thus an above-described detection result is then generated in both hearing devices 4, independently of one another in each hearing device. The output signal is then generated in each hearing device 4 on the basis of the associated detection result.

An embodiment variant is preferred, however, in which merely a provisional detection result is generated in each of the two hearing devices 4 by the aforementioned comparator units. It is also preferred that each hearing device 4 transmits its preliminary detection result by means of the transceiver 14 and the antenna unit 12 connected thereto to the other hearing device 4 in each case. In each of the two hearing devices 4, the two provisional detection results from the two detection units 22 of the two hearing devices 4 are then also analyzed jointly. This is typically done in a logic unit (not shown explicitly) of the output stage 34. This finally generates the detection result, i.e. the final detection result.

As already mentioned, the two filter types of the filters a, b of the submodules A, B are preferably in the form of static filters, each having fixed filter coefficients. In this case, the filter coefficients are preferably specified by the manufacturer. Then it is also preferred that at least the detection units 22 of the two hearing devices 4 of the hearing device system 2 are not personalized or customized.

The corresponding filter coefficients are also preferably determined in a coefficient determination method. The determining is performed here preferably without involvement of the subsequent wearer, i.e. the end user. It is also expedient if a hearing device dummy is used for determining these filter coefficients as part of the coefficient determination method. The hearing device dummy has at least two test input transducers 36, indicated in FIG. 6. During the coefficient determination method, the test input transducers 36 are then preferably used in various tests to generate input signals in each case. These are expediently recorded and, for example, analyzed in a computer, which is not presented in greater detail.

In the various tests, preferably different scenarios containing various test persons are simulated. It is also preferred that in the tests, various test persons act as the test wearer 38 for the test apparatus, and also preferably various test persons act as the wanted signal source 40 in the sense of a conversational partner, where the wanted signal sources 40 are preferably positioned in front of the test wearers 38, as indicated in FIG. 6.

The computer is then also preferably used to determine suitable filter coefficients in each test and for each simulated scenario, and in particular both for the above-described filters a and for the filters b. A dataset containing a multiplicity of suitable values is thereby obtained in total for each filter coefficient.

Then, for example, what is known as a k-means algorithm is applied to the associated datasets in order to obtain those filter coefficients that ultimately are specified for the filters a, b of the submodules A, B.

LIST OF REFERENCE SIGNS

2 hearing device system
4 hearing device
6 input transducer
8 signal processing apparatus
10 output transducer
12 antenna unit
14 transceiver
16 analog-to-digital converter
18 main unit
20 digital-to-analog converter

22 detection unit
24 neural network
26 input stage
28 channel module
30 equalizer unit
32 measurement unit
34 output stage
36 test input transducer
38 test wearer
40 wanted signal source
A submodule
B submodule
a filter
b filter

The invention claimed is:

1. A method for detecting activity of an own voice of a wearer of a hearing device by way of a signal processing apparatus of the hearing device, the method comprising:

generating a first input signal by a first input transducer of the hearing device, and generating a second input signal by a second input transducer of the hearing device;

supplying the first and second input signals to a detection unit of the signal processing apparatus, the detection unit having a neural network and an input stage connected upstream of the neural network in a direction of a signal flow;

generating information signals by the input stage on a basis of the first and second input signals;

evaluating the information signals by the neural network and detecting when the own voice of the wearer of the hearing device is active and when it is not; and outputting a detection result by the detection unit based on the evaluation of the information signals by the neural network.

2. The method according to claim 1, which comprises doing without a personalization of the detection unit.

3. The method according to claim 1, which comprises training the neural network using a number of acoustic signals in which own voices of various test wearers are recorded.

4. The method according to claim 1, which comprises:

providing the input stage with a first filter that corresponds to a first filter type and a second filter that corresponds to a second filter type;

generating a first filter signal by the first filter and generating a second filter signal by the second filter.

5. The method according to claim 4, wherein the first filter type is designed to extract wanted signals from wanted signal sources, and wherein the second filter type is designed to mask own voices.

6. The method according to claim 4, wherein the first and second filter types are static filters having fixed filter coefficients.

7. The method according to claim 6, wherein the filter coefficients for the second filter type are specified on a basis of an analysis of recorded acoustic signals in which own voices of various test wearers are recorded.

8. The method according to claim 7, which comprises using at least one adaptive test filter for the analysis.

9. The method according to claim 4, which comprises generating an information signal by combining each of the filter signals with a reference signal, which is based on at least one of the first or second input signals.

10. The method according to claim 9, which comprises determining an attenuation quantity by combining one of the filter signals with one of the reference signals, and transmitting the attenuation quantity with a corresponding information signal to the neural network.

11. The method according to claim 1, which comprises evaluating the information signals by the neural network to form an evaluation, and outputting, as the evaluation, a prediction value by the neural network.

12. The method according to claim 11, wherein the neural network is a recurrent neural network, and the prediction value is generated and output by the recurrent neural network.

13. The method according to claim 1, which comprises:

determining a provisional detection result by the detection unit;

analyzing the provisional detection result in the detection unit together with a further provisional detection result, which is determined by a further detection unit in a further hearing device and transmitted by the further hearing device; and determining the detection result in the detection unit by an analysis of the provisional detection result and the further provisional detection result.

14. A hearing device having at least one operating mode configured to perform the method according to claim 1.

15. A hearing device system, comprising two hearing devices each configured to perform the method according to claim 1 in at least one operating mode thereof.

* * * * *